(12) United States Patent
Rohwer et al.

(10) Patent No.: US 7,743,785 B2
(45) Date of Patent: Jun. 29, 2010

(54) PASSIVE PRESSURE RELIEF DEVICE SYSTEM BASED ON THERMOBATTERY FOR A COMPRESSED GAS STORAGE TANK

(75) Inventors: Thorsten Rohwer, Trebur (DE); Christian Koenig, Dreieich (DE)

(73) Assignee: GM Global Technology Operations, Inc., Detroit, MI (US)

( * ) Notice: Subject to any disclaimer, the term of this patent is extended or adjusted under 35 U.S.C. 154(b) by 532 days.

(21) Appl. No.: 11/437,545

(22) Filed: May 19, 2006

(65) Prior Publication Data

US 2007/0267062 A1 Nov. 22, 2007

(51) Int. Cl.
*F16K 17/38* (2006.01)
(52) U.S. Cl. ......................................................... 137/79
(58) Field of Classification Search .................... 137/79; 429/12, 34
See application file for complete search history.

(56) References Cited

U.S. PATENT DOCUMENTS

| 2,564,295 | A | * | 8/1951 | Benz et al. ..................... 137/80 |
| 5,006,429 | A | * | 4/1991 | Pracchia et al. ............. 429/112 |
| 6,137,417 | A | | 10/2000 | McDermott |
| 2003/0038610 | A1 | | 2/2003 | Munshi et al. |
| 2004/0055384 | A1 | | 3/2004 | Brazier et al. |
| 2005/0000802 | A1 | * | 1/2005 | Hobbs ......................... 204/277 |

FOREIGN PATENT DOCUMENTS

| DE | 686778 | 1/1940 |
| WO | 02/40914 A2 | 5/2002 |
| WO | 2004014683 A1 | 2/2004 |

\* cited by examiner

*Primary Examiner*—John Rivell
*Assistant Examiner*—Craig M Schneider
(74) *Attorney, Agent, or Firm*—Dinsmore & Shohl LLP

(57) ABSTRACT

A compressed gas storage system with an incorporated pressure relief device is disclosed. The compressed gas storage system comprises a tank for storing a compressed gas, a battery in the direct surroundings of the tank, and a relief valve in communication with the tank. The relief valve is configured to be responsive to electrical current generated by the battery. The battery is configured to define an electrically active state when it reaches a temperature above a maximum safe operating temperature of the compressed gas storage system. The electrically active state of the battery is characterized by the generation of sufficient electrical current to open the relief valve which permits gas to escape from the tank. In another embodiment, a thermocouple in combination with a conducting metal may be substituted for the battery.

15 Claims, 3 Drawing Sheets

PASSIVE PRESSURE RELIEF DEVICE SYSTEM BASED ON THERMOBATTERY FOR A COMPRESSED GAS STORAGE TANK

BACKGROUND OF THE INVENTION

The present invention generally relates to a pressure relief device and, in particular, relates to a pressure relief device system for a compressed gas storage system.

BRIEF SUMMARY OF THE INVENTION

It is a feature of the embodiments of the present invention to increase the safety of a compressed gas storage system by the incorporation of an improved pressure relief device system. Other features of the embodiments of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

Figure 1:
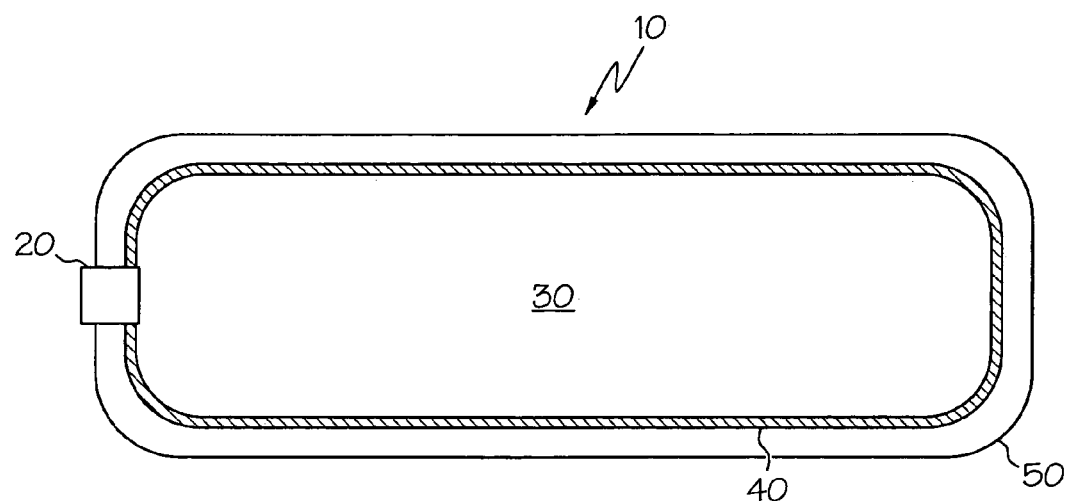
FIG. 1 illustrates a compressed gas storage tank according to an illustrative embodiment of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION

In the following detailed description of exemplary embodiments, reference is made to the accompanying drawings that form a part hereof, and in which are shown by way of illustration, and not by way of limitation, specific embodiments in which the invention may be practiced. It is to be understood that other embodiments may be utilized and that logical, mechanical and electrical changes may be made without departing from the spirit and scope of the present invention.

Referring initially to FIG. 1, a compressed gas storage tank 10 is illustrated. The tank 10 may comprises a hollow body 30 for the storage of a gas under pressure. Hydrogen is an example of a typical gas that might be stored in the tank, but other gases may be stored as well such as, for example, natural gas. The hollow body 30 is defined by a liner 40, or gas permeation barrier, which seals the tank 10. The liner 40 may be comprised of a high molecular weight polymer material such as, for example, high density polyethylene (HDPE). A composite material 50 surrounds the liner 40 helping to maintain the gas under pressure. The composite material 50 may be comprised of a carbon composite shell such as, for example, carbon fibers plus resin. The tank 10 can typically store gases under pressure of approximately 10,000 psi, or 700 bar. An interface point 20 between the hollow body 30 of the tank 10 and the outside environment allows for the filling and removing of gas from the tank 10.

Figure 2:
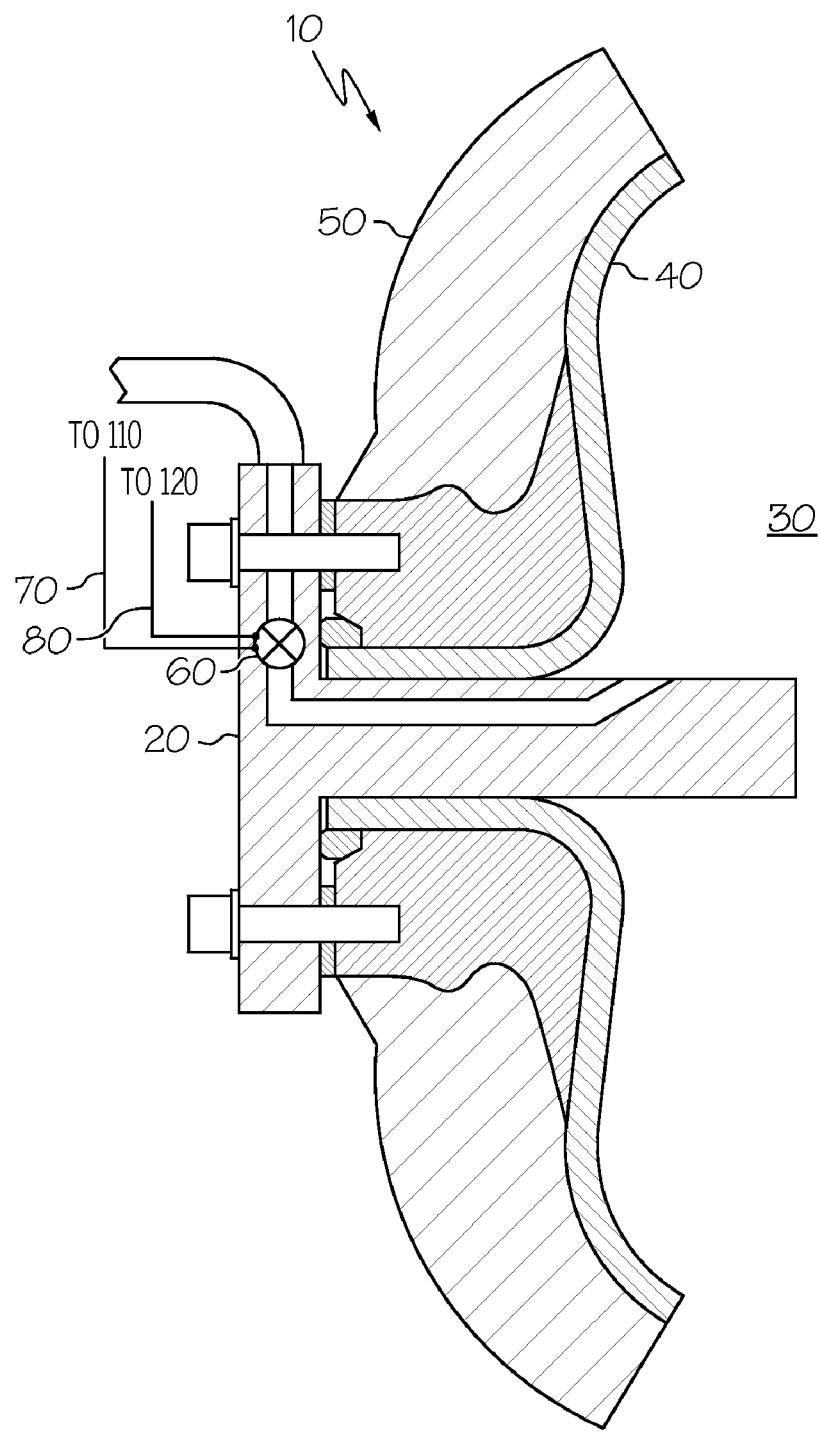
FIG. 2 illustrates an interface point of a tank with the environment and an incorporated pressure relief device of a compressed gas storage system according to an illustrative embodiment of the present invention.

FIG. 2 illustrates the interface point 20. The interface point 20 may extend into the hollow body 30 of the tank 10 as illustrated in FIG. 2 or may extend only through to the liner 40. In most cases, the interface point 20 and the tank 10 are made of different materials. The temperature at the interface point 20 can vary over an operational temperature gradient. For example, for hydrogen, when filling the tank 10 the temperature may rise to approximately 80° C. and when hydrogen is removed from the tank 10 the temperature may fall to approximately −80° C. This operational temperature gradient is a function of the tank 10 volume as well as the configuration of the compressed gas inlet and outlet plumbing at the interface point 20. The operational temperature gradient represents the temperature swing the tank 10 undergoes from empty to full to empty and extends from a minimum operating temperature to a maximum operating temperature.

Within the interface point 20, there is a pressure relief device 60 that vents the gas in the hollow body 30 of the tank 10 to the environment. The pressure relief device 60 closes one of the connections between the interior of the tank 10 and the outside. The pressure relief device 60 is designed to be activated (i.e., opened) by external heat in the close proximity, or direct surroundings, of the tank 10.

The purpose of the pressure relief device 60 is to relieve the pressure of the tank 10 before the structure of the tank 10 is significantly damaged by the nearby heat. The pressure relief device 60 can be, for example, an electrically activated valve that opens in response to a electrical current generated from a battery. In one embodiment, the valve may be activated by a thermobattery 100. In another embodiment, a combination of thermocouples attached to a good heat conducting metal foil such as, for example, aluminum, and an electronic circuit (not illustrated) may activate the valve.

In one embodiment and in the case of increasingly high temperatures, the thermobattery 100 may become electrically activated by the increasing heat. As the thermobattery 100 becomes electrically active, it, in turn, starts generating electrical current. When the temperature in the direct surroundings of the tank 10 exceeds a maximum temperature of the tank 10, a sufficient level of electrical current may be generated by the thermobattery 100. If the maximum safe operating temperature of the tank 10 is exceeded significantly, the thermobattery 100 is activated, and the electric current flows by conventional means, such as through cathode connector 70 and anode connector 80, to open the pressure relief device 60. As soon as the pressure relief device 60 opens, the gas within the tank 10 is vented to the environment in order to relieve the pressure within the tank 10.

In another embodiment, increasingly high environmental temperatures result in an increased thermoelectric voltage output from the combination of thermocouples. This increased thermoelectric voltage output, in turn, electrically activates the pressure relief device 60 causing the pressure relief device 60 to open venting the gas within the tank 10 to the environment and relieving the pressure within the tank 10.

Figure 3:
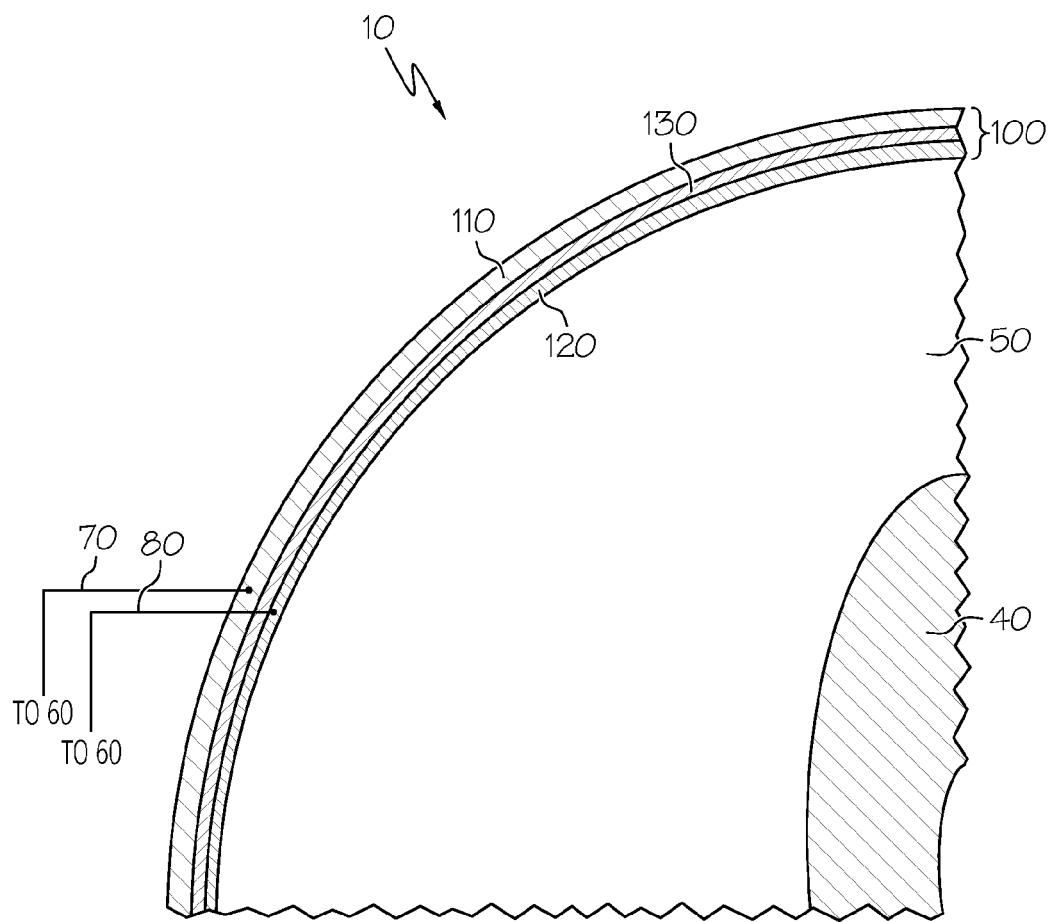
FIG. 3 illustrates a foil-type battery in thermal communication with a tank of a compressed gas storage system according to an illustrative embodiment of the present invention.

FIG. 3 illustrates one embodiment of a thermally activated thermobattery 100 that may trigger the opening of the pressure relief device 60. The thermally activated battery 100 comprises a cathode 110 and anode 120 which are separated by an electrolyte 130. The battery 100 is placed in close proximity to the tank 10 and is reactive to temperatures outside the tank 10. The electrolyte 130 is not ionically conductive and is frozen under normal environmental conditions (i.e., temperatures between about −25° C. to about 50° C.) and therefore, not ionically conductive. When the electrolyte 130 is frozen, the battery 100 is electrically inactive and, therefore, does not show an electric discharge.

In the case of a fire, or other increasing high temperatures, in close proximity of the tank 10, the tank 10 becomes hotter resulting in the battery 100 also becoming heated which in turn causes the electrolyte 130 to melt. As the electrolyte 130 melts, the battery 100 gradually becomes electrically active. As the battery 100 becomes electrically active, an electrical current is produced. At a threshold point, the electrically active battery 100 produces electrical current that flows by conventional means, such as through cathode connector 70 and anode connector 80, to open the pressure relief valve 60 and relieve the gas pressure in the tank 10 by releasing the gas from the tank 10 into the environment.

In one embodiment, a thermobattery 100 is attached to the impact shield located below the tank 10. The impact shield may be fiberglass, reinforced plastic, or any other material known in the art. In another embodiment, the thermobattery 100 is wrapped around the tank 10 as a continuous multilayer structure in physical contact with the tank 10 and conforming to and covering a curved outer surface of the tank 10, as illustrated in FIG. 3. By such construction, the thermobattery 100 can be triggered by spot heat sources that could relieve pressure before an explosion or structural damage to the tank 10 occurs. In both embodiments, the battery 100 covers a significant portion of the surface of the tank 10. By covering more surface area, the tank 10 can be more completely protected against high heat sources.

In another embodiment, the combination of thermocouples and metal foil arrangement is attached to the impact shield located below the tank 10. In yet another embodiment, the combination of thermocouples and metal foil arrangement is wrapped around the tank 10. The thermocouple embodiment provides the same protection against external heat sources as the thermobattery 100 by electrically activating the pressure relief device 60 before the tank 10 becomes damaged by the external heat.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it

What is claimed is:

1. A compressed gas storage system comprising a tank for storing a compressed gas, a battery in physical contact with said tank, and a relief valve in communication with said tank, wherein:
    said tank comprises at least one curved outer surface;
    said relief valve is configured to be responsive to electrical current generated by said battery;
    said battery is configured to define an electrically active state when it reaches a temperature above a maximum safe operating temperature of said compressed gas storage system;
    said battery comprises a continuous multilayer structure wrapped around said tank so as to conform to and cover said curved outer surface of said tank, said continuous multilayer structure comprising an anode layer in direct physical contact with said tank, a cathode layer disposed over said anode layer, and a thermally activated electrolyte layer separating said anode layer and said cathode layer; and
    said electrically active state of said battery is characterized by the generation of sufficient electrical current to open said relief valve, permitting gas to escape from said tank.

2. The compressed gas storage system of claim 1, wherein said compressed gas storage system defines an operational temperature gradient extending from a minimum operational temperature to a maximum operational temperature.

3. The compressed gas storage system of claim 1, wherein said maximum safe operating temperature is at least high enough to exceed maximum operational temperature of said compressed gas storage system.

4. The compressed gas storage system of claim 1, wherein said compressed gas storage system defines an operational temperature gradient.

5. The compressed gas storage system of claim 1, wherein a maximum safe operating temperature is at least 20° C. greater than said temperature gradient 6. The compressed gas storage system of claim 1, wherein said electrolyte is frozen under normal environmental temperatures.

7. The compressed gas storage system of claim 6, wherein said electrolyte is not ionic conductive under normal environmental conditions.

8. The compressed gas storage system of claim 1, wherein said compressed gas tank stores hydrogen gas.

9. The compressed gas storage system of claim 8, wherein said compressed gas tank supplies hydrogen gas to a fuel cell.

10. A vehicle comprising said compressed gas storage system as claimed in claim 1, wherein said compressed gas storage system supplies hydrogen to a fuel cell system, wherein said fuel cell system serves as a source of motive power for said vehicle.

11. The vehicle of claim 10, wherein said maximum safe operating temperature is at least high enough to exceed a maximum operating temperature of said fuel cell system.

12. The compressed gas storage system of claim 1, wherein said compressed gas tank stores natural gas.

13. The compressed gas storage system of claim 12, wherein said compressed gas tank supplies natural gas to a combustion engine.

14. A vehicle comprising said compressed gas storage system as claimed in claim 1, wherein said compressed gas storage system supplies natural gas to a combustion engine, wherein said combustion engine serves as a source of motive power for said vehicle.

15. A method of heat activated pressure relief of a tank for storing a compressed gas, the method comprises:

providing a battery comprising a continuous multilayer structure wrapped around said tank so as to conform to and cover a curved outer surface of said tank, said continuous multilayer structure comprising an anode layer in direct physical contact with said tank, a cathode layer disposed over said anode layer, and a thermally activated electrolyte layer separating said anode layer and said cathode layer;

melting at least a portion of said thermally activated electrolyte layer by a spot heat source directed at any portion of said tank covered by said battery;

activating said battery electrically by said melting of said portion of said thermally activated electrolyte;

generating an electrical current by said electrical activation of said battery;

opening a relief valve configured to be responsive to sufficient generation of said electrical current by said battery, wherein said relief valve is in communication with said tank; and releasing gas from said tank by the opening of said relief valve to relieve pressure within said tank.

* * * * *